(12) United States Patent
Schelfaut et al.

(10) Patent No.: US 11,407,518 B2
(45) Date of Patent: Aug. 9, 2022

(54) AIRCRAFT AND PROPULSION ENGINE MOUNT SYSTEM

(71) Applicant: General Electric Company, Schenectady, NY (US)

(72) Inventors: Timothy Leo Schelfaut, Liberty Township, OH (US); Anthony Michael Metz, Harrison, OH (US); Jonathan Edward Coleman, Mason, OH (US); Thomas P. Joseph, West Chester, OH (US); Brian Michael Dixon, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 153 days.

(21) Appl. No.: 16/794,288

(22) Filed: Feb. 19, 2020

(65) Prior Publication Data

US 2021/0253260 A1 Aug. 19, 2021

(51) Int. Cl.
*B64D 27/26* (2006.01)
*B64D 29/06* (2006.01)

(52) U.S. Cl.
CPC .............. *B64D 27/26* (2013.01); *B64D 29/06* (2013.01); *B64D 2027/266* (2013.01)

(58) Field of Classification Search
CPC .......................... B64D 27/26; B64D 2027/262
See application file for complete search history.

(56) References Cited

U.S. PATENT DOCUMENTS

| 3,750,983 | A | * | 8/1973 | Morris | B64D 27/18 |
| | | | | | 244/54 |
| 5,174,525 | A | * | 12/1992 | Schilling | F02C 7/20 |
| | | | | | 244/54 |
| 5,620,154 | A | | 4/1997 | Hey | |
| 7,398,945 | B2 | | 7/2008 | Huggins et al. | |
| 8,469,309 | B2 | | 6/2013 | Stuart et al. | |
| 8,727,268 | B2 | | 5/2014 | Combes et al. | |
| 9,211,955 | B1 | | 12/2015 | Mauldin et al. | |
| 9,988,155 | B2 | | 6/2018 | Alexander | |
| 10,246,196 | B2 | | 4/2019 | Pautis et al. | |
| 2016/0167798 | A1 | | 6/2016 | Prentice | |
| 2017/0259929 | A1 | | 9/2017 | Stuart | |
| 2019/0009918 | A1 | | 1/2019 | Zameroski et al. | |
| 2019/0217964 | A1 | | 7/2019 | Alstad et al. | |

* cited by examiner

*Primary Examiner* — Timothy D Collins
*Assistant Examiner* — Eric Acosta
(74) *Attorney, Agent, or Firm* — Venable LLP; Peter T. Hrubiec; Michele V. Frank

(57) ABSTRACT

An aircraft and propulsion system are provided. The aircraft includes an airframe including one or more of a fuselage, a wing, or an empennage. The aircraft includes an aircraft propulsion system including a front frame and an aft frame. A front mount link is connected to the airframe and the front frame, and the aft frame is selectively connected to the airframe by an aft mount link.

9 Claims, 9 Drawing Sheets

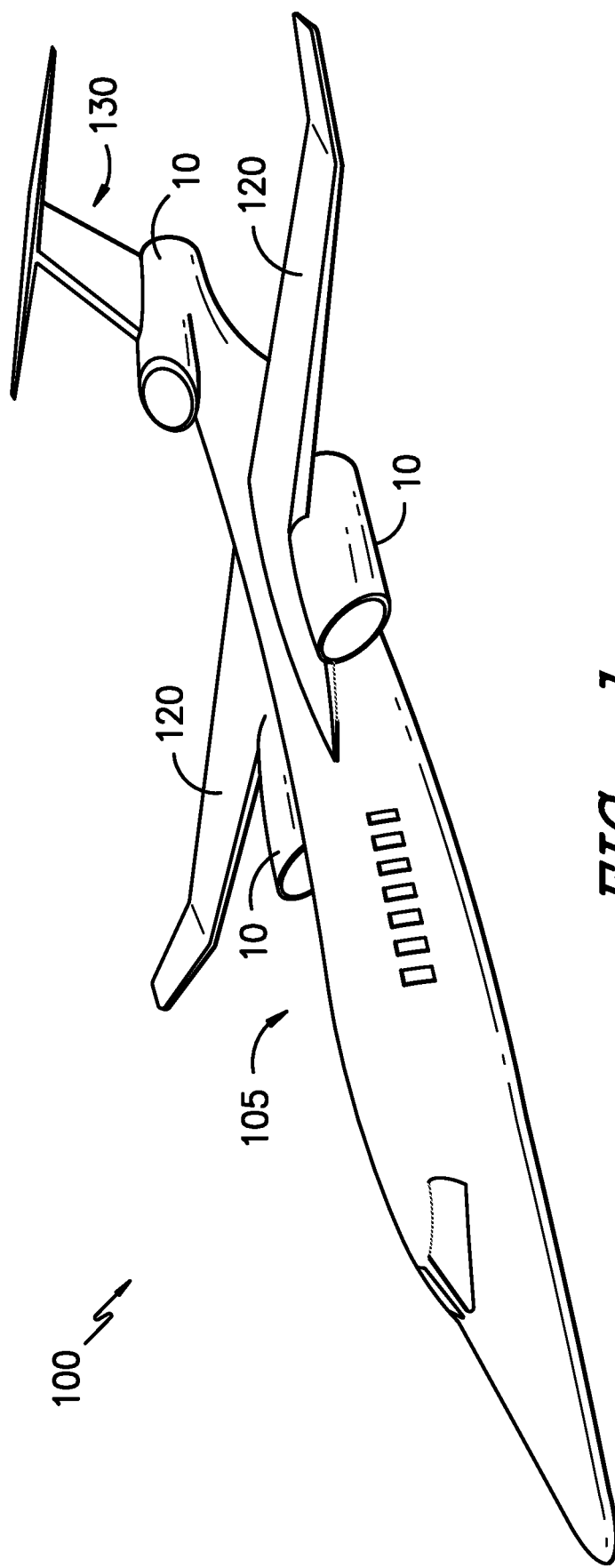
FIG. -1-

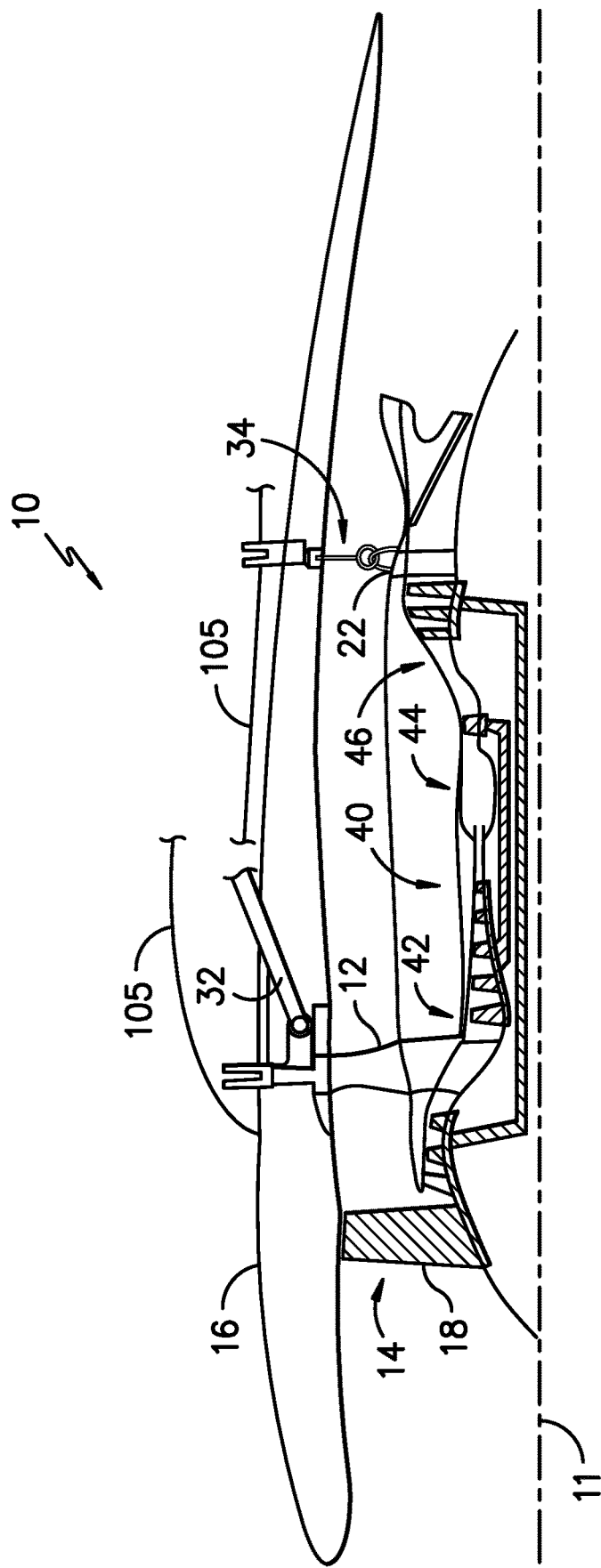
FIG. -2-

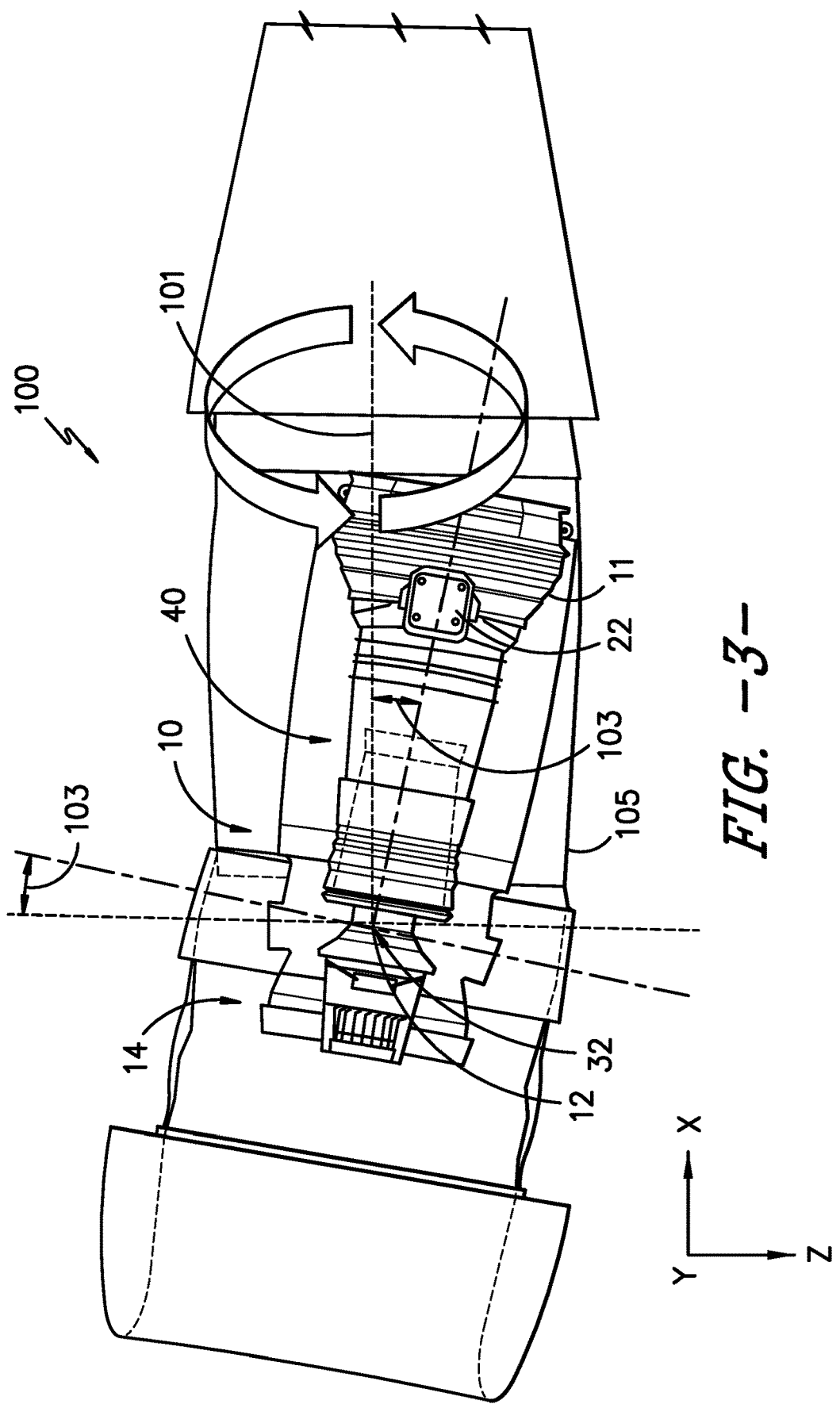
FIG. -3-

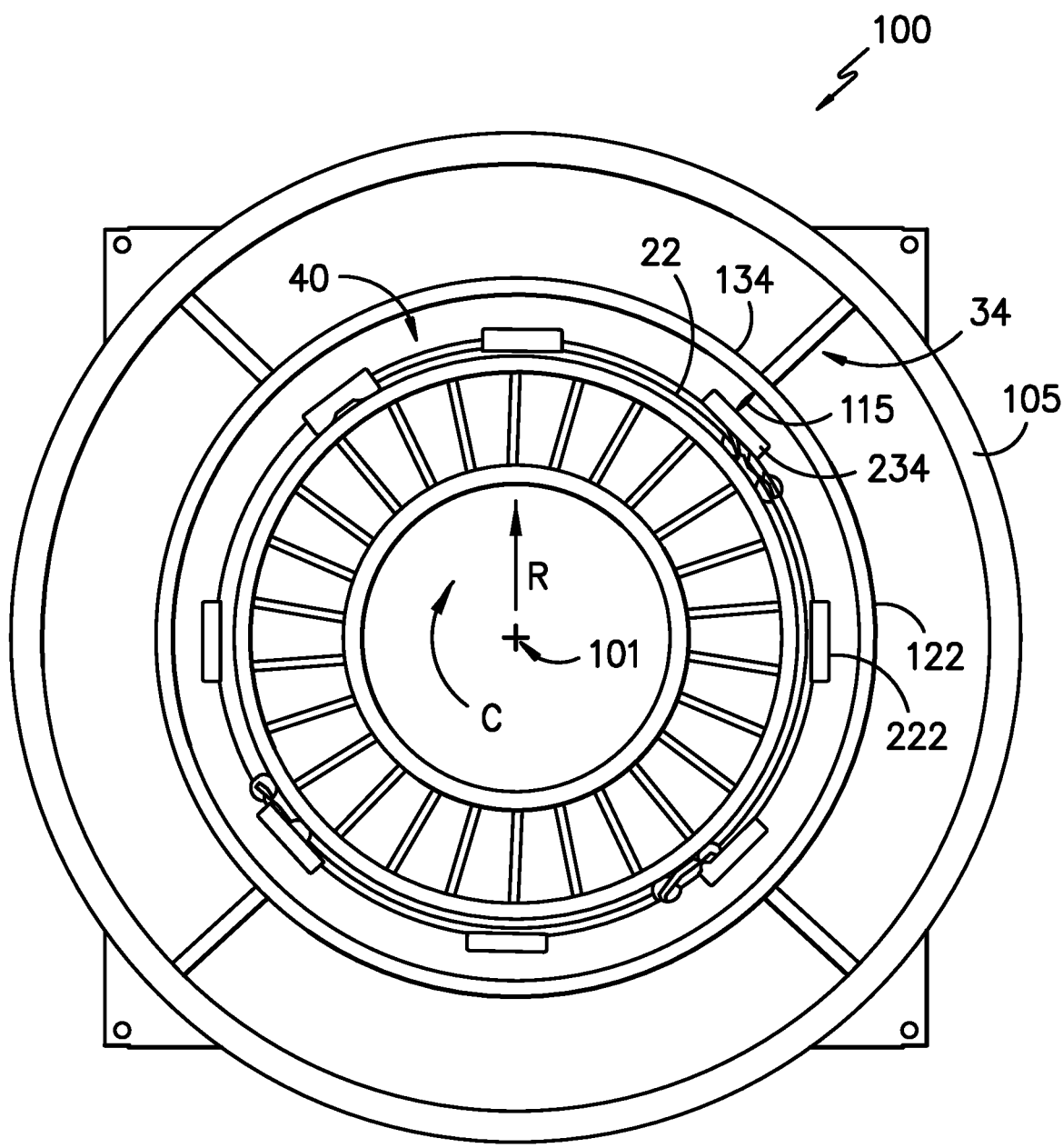
FIG. -4-

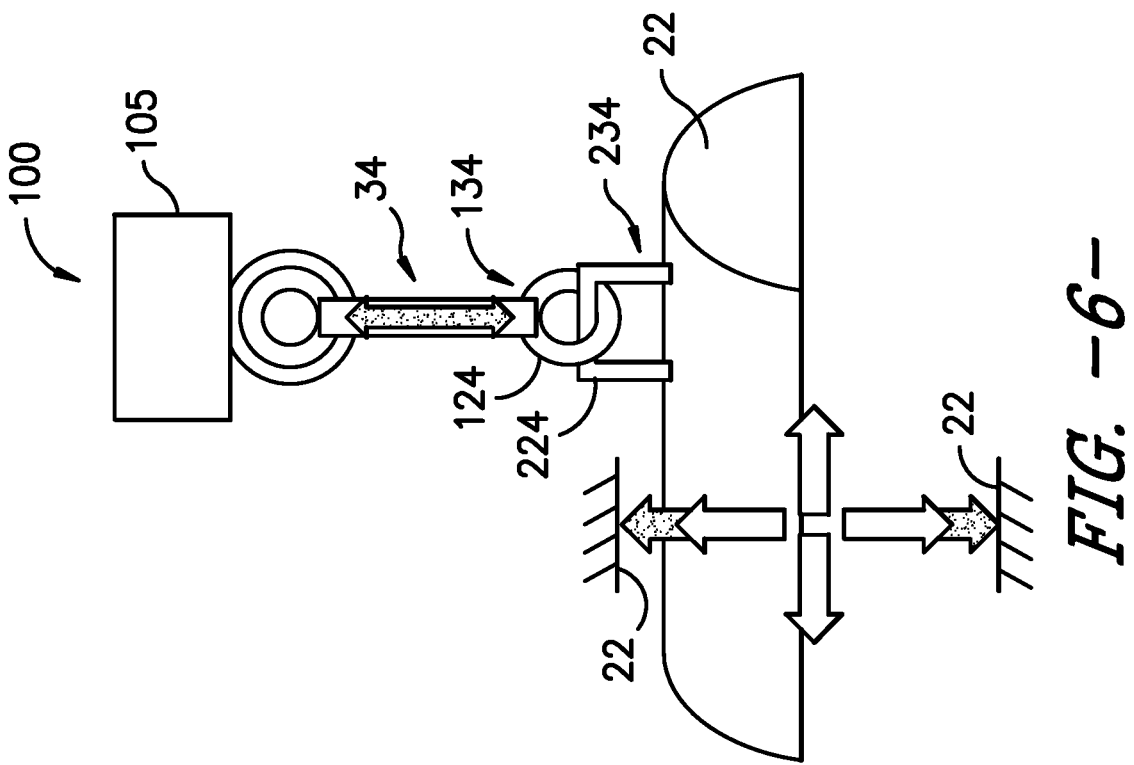
FIG. -5-
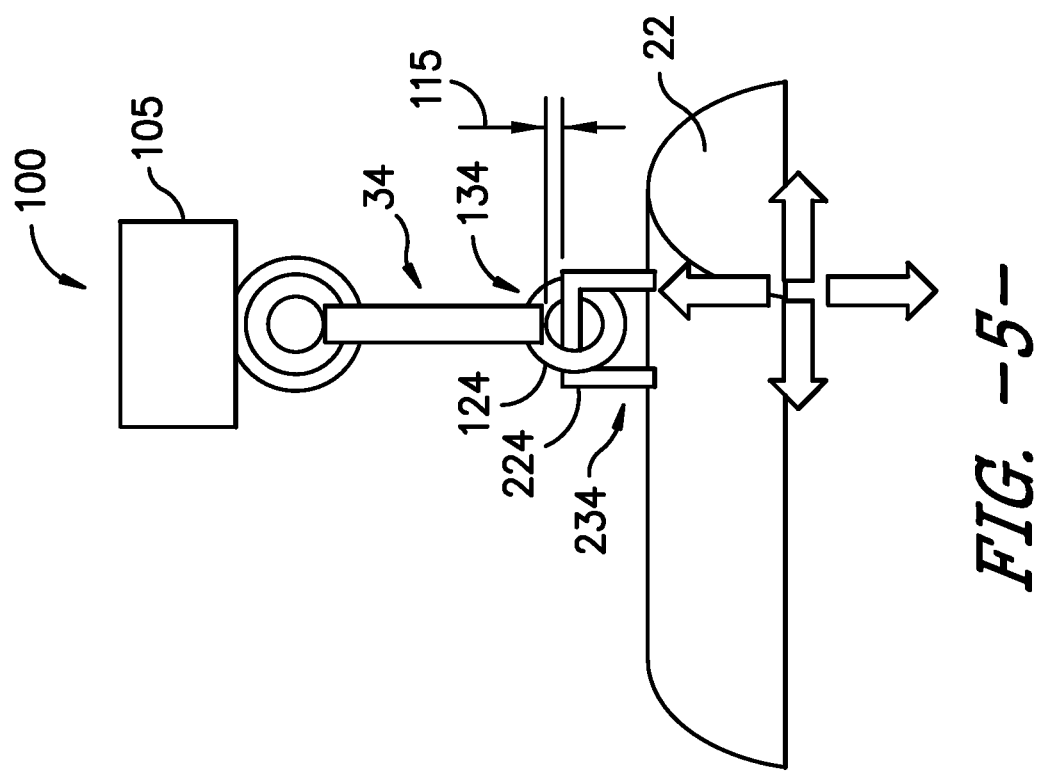
FIG. -6-

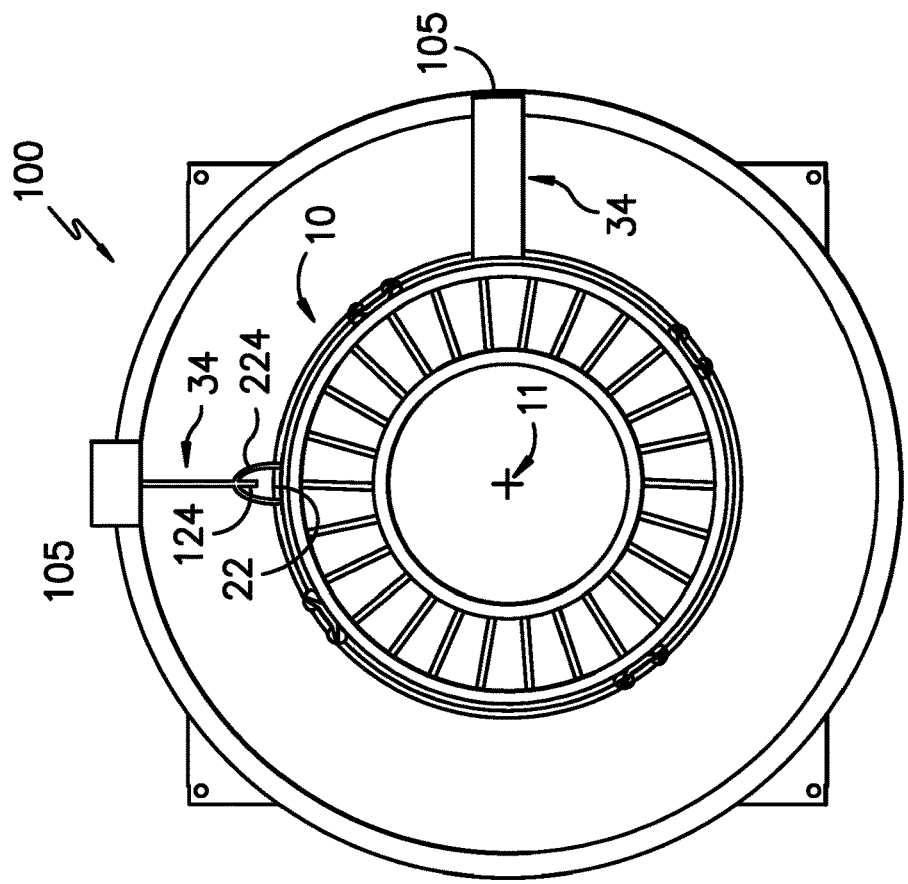
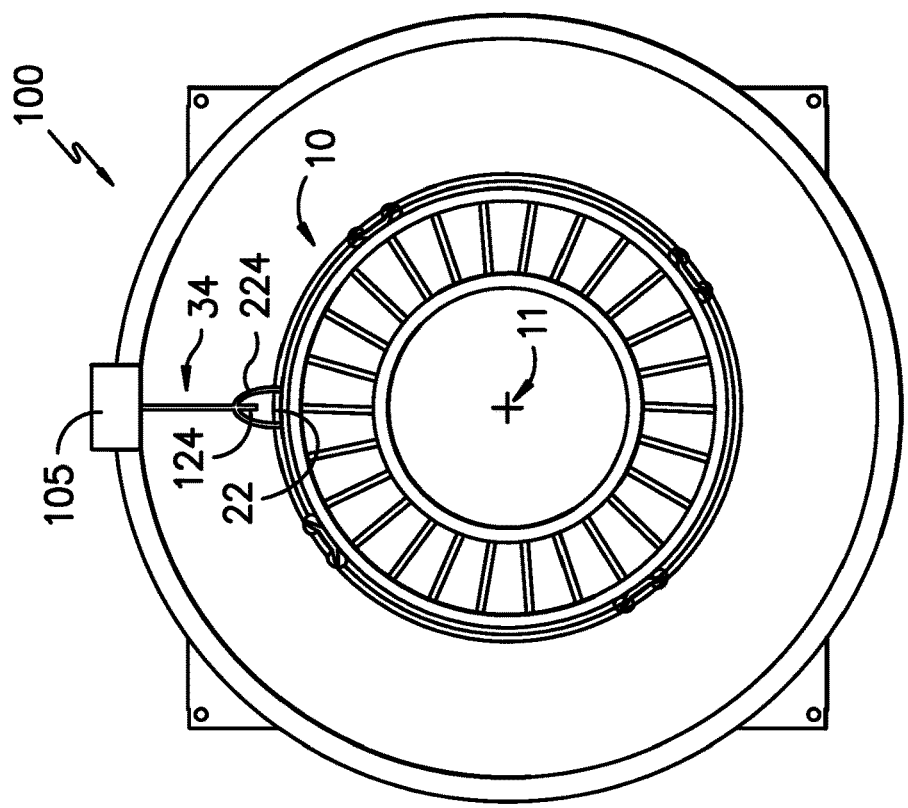

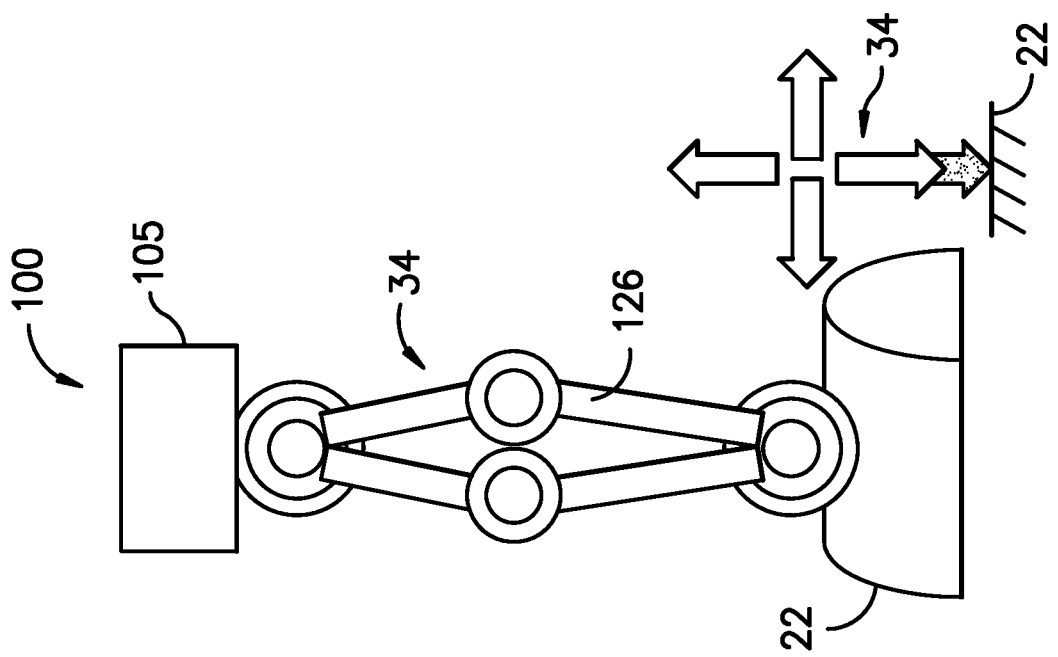
FIG. -10-
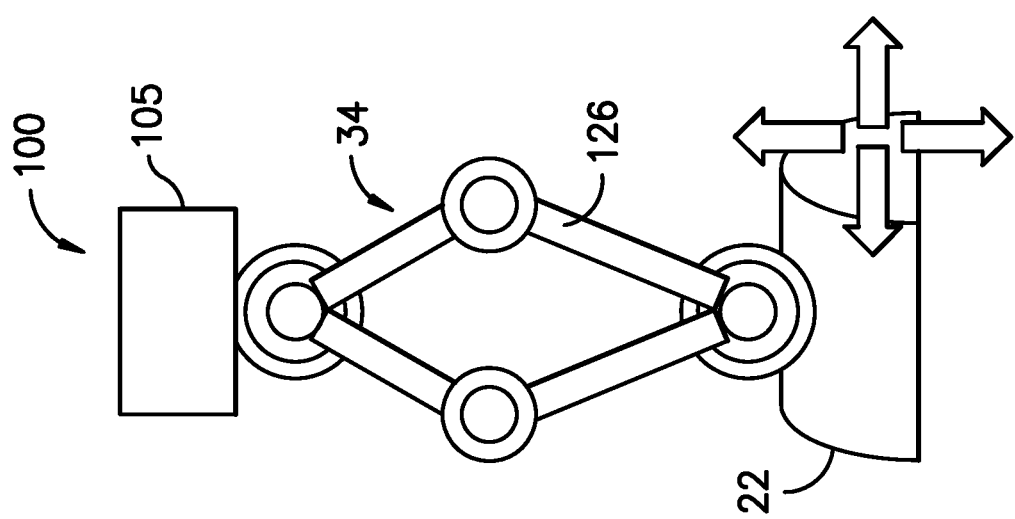
FIG. -9-

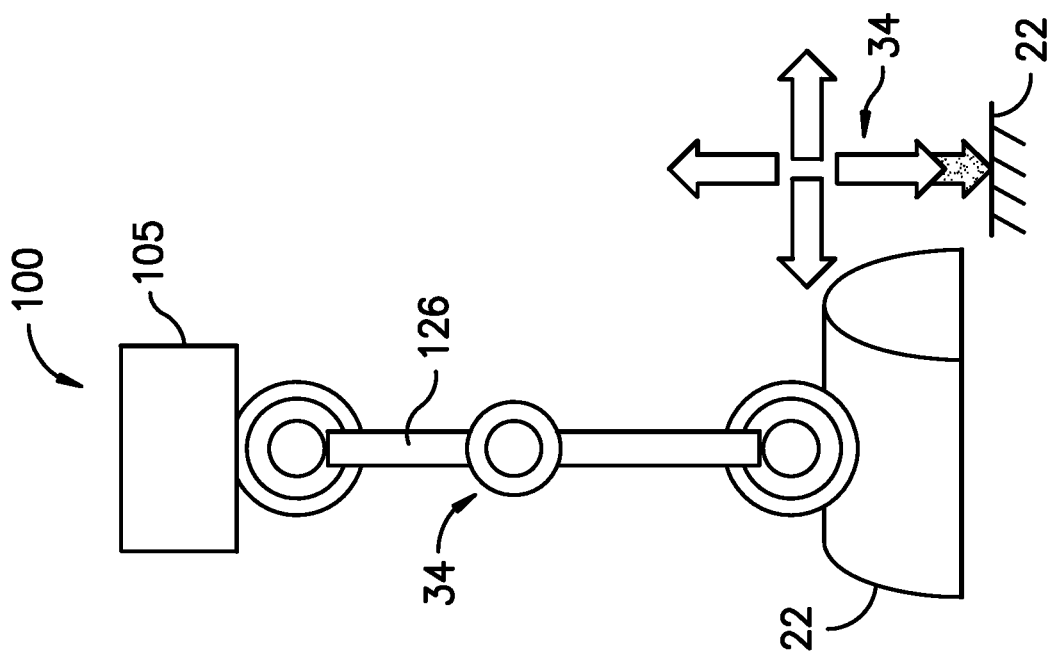
FIG. -12-
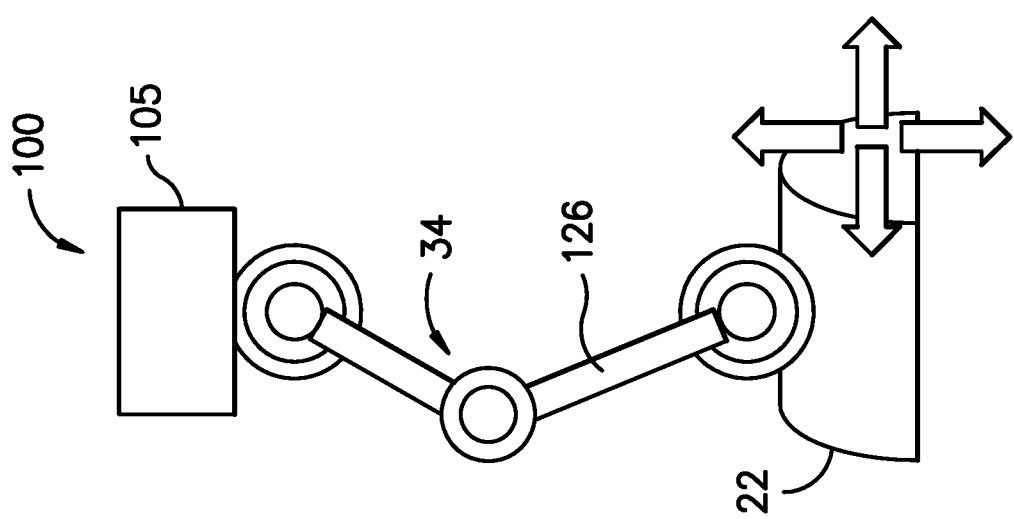
FIG. -11-

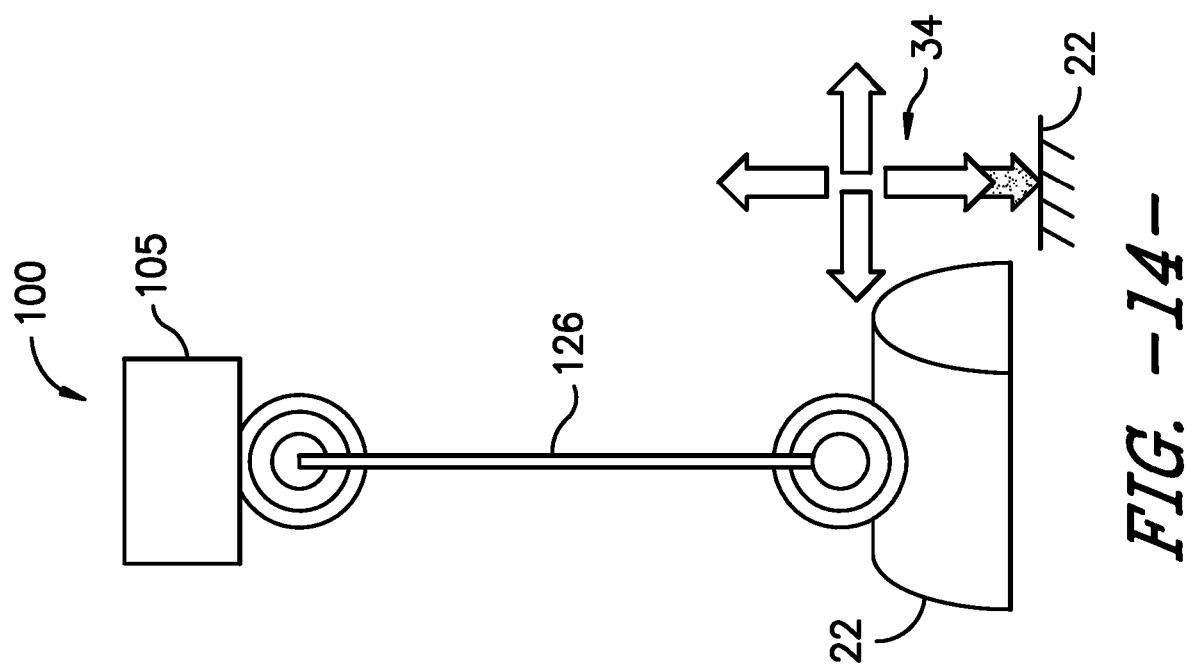
FIG. -14-
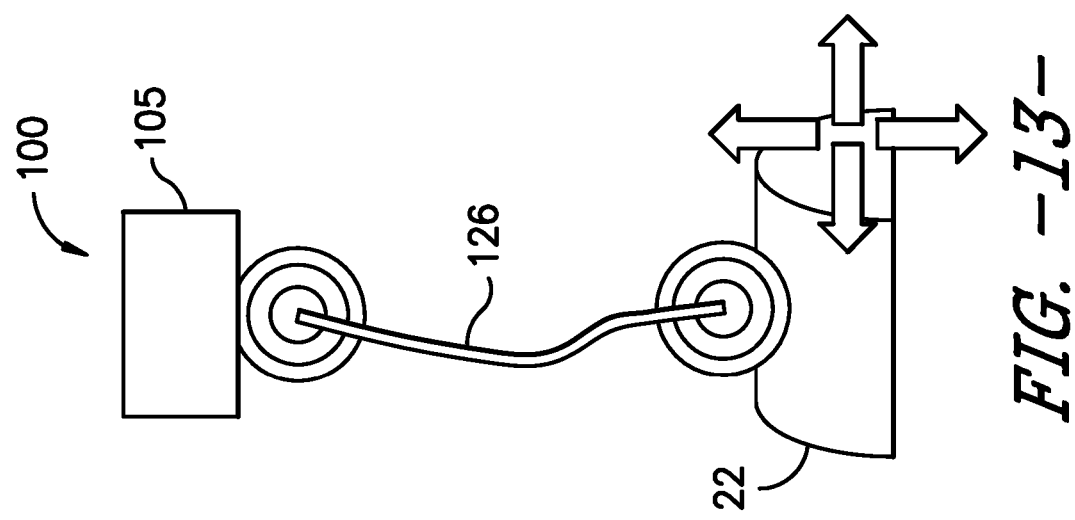
FIG. -13-

AIRCRAFT AND PROPULSION ENGINE MOUNT SYSTEM

FIELD

The present subject matter relates generally to structures and systems for mounting a propulsion engine to an aircraft airframe.

BACKGROUND

Propulsion engines, such as turbofan engines, are mounted to aircraft airframes, such as fuselages, empennages, and over or under wings. Conventional mount structures include multiple rigid attachment links, such as at a forward and aft plane of the turbofan engine. Certain mount systems, such as cantilevered mounts attached at a forward plane, may generally provide improved clearance distortion characteristics in the core engine under normal engine operation. Without an aft mount attachment, a bending moment that would otherwise distort engine clearances are not transmitted through the core engine.

However, cantilevered mount systems are susceptible to excessive engine deflection following extreme aircraft maneuvers that may result from foreign object ingestion, bird strikes, blade out, or other failure modes. Excessive engine deflection may result in excessive loads at the mount location, such as at the forward mount, flanges, or other attachment points from which an engine core is cantilevered. Excessive loads may manifest as engine oscillations following an extreme engine or aircraft event. Conventionally, significant mechanical reinforcement of the mating flanges or other attachment points is required to withstand the extreme load conditions from extreme engine or aircraft events. However, such additional reinforcements significantly increase engine weight, which adversely impacts engine and aircraft fuel consumption.

Therefore, an improved propulsion engine mount system that provides improved clearance distortion characteristics and mitigates excessive deflection is desired.

BRIEF DESCRIPTION

Aspects and advantages of the invention will be set forth in part in the following description, or may be obvious from the description, or may be learned through practice of the invention.

Aspects of the present disclosure are directed to an aircraft propulsion system defining a nominal centerline axis and including a fan assembly operably connected to a core engine. The fan assembly includes a forward frame and the core engine comprising an aft frame. The core engine includes an engine centerline axis in which the engine centerline axis is substantially coaxial to the nominal centerline axis during normal propulsion system operation. The engine centerline axis is at an acute angle to the nominal centerline axis when the core engine is deflected. A nacelle surrounds the core engine. The nacelle is connected to the forward frame. An aft mount link is connected to the nacelle. The aft mount link is extended between the nacelle and the aft frame, and the aft mount link is loaded by deflection of the core engine.

Another aspect of the present disclosure is directed to an aircraft including an airframe including one or more of a fuselage, a wing, or an empennage. The aircraft includes a propulsion system including a front frame and an aft frame. A front mount link is connected to the airframe and the front frame, and the aft frame is selectively connected to the airframe by an aft mount link.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary aircraft according to an aspect of the present disclosure;

FIG. 2 is a cross sectional view of an exemplary embodiment of a portion of an aircraft including an exemplary embodiment of a propulsion system according to aspects of the present disclosure;

FIG. 3 is a perspective view of an exemplary embodiment of a propulsion system deflecting at the airframe;

FIG. 4 is a flowpath view of an exemplary embodiment of a portion of an aircraft and propulsion system according to aspects of the present disclosure;

FIG. 5 is a schematic depiction of an embodiment of a mount structure of exemplary embodiments of the propulsion system and aircraft of FIGS. 1-2 in a substantially unloaded state;

FIG. 6 is a schematic depiction of an embodiment of a mount structure of exemplary embodiments of the propulsion system and aircraft of FIG. 5 when the propulsion system is deflected to or beyond a threshold condition;

FIG. 7 is a flowpath view of an exemplary embodiment of a portion of an aircraft and propulsion system including the mount structure of FIGS. 5-6;

FIG. 8 is a flowpath view of an exemplary embodiment of a portion of an aircraft and propulsion system including the mount structure of FIGS. 5-6;

FIG. 9 is a schematic depiction of an embodiment of a mount structure of exemplary embodiments of the propulsion system and aircraft of FIGS. 1-2 in a substantially unloaded state;

FIG. 10 is a schematic depiction of an embodiment of a mount structure of exemplary embodiments of the propulsion system and aircraft of FIG. 9 when the propulsion system is deflected to or beyond a threshold condition;

FIG. 11 is a schematic depiction of an embodiment of a mount structure of exemplary embodiments of the propulsion system and aircraft of FIGS. 1-2 in a substantially unloaded state;

FIG. 12 is a schematic depiction of an embodiment of a mount structure of exemplary embodiments of the propulsion system and aircraft of FIG. 11 when the propulsion system is deflected to or beyond a threshold condition;

FIG. 13 is a schematic depiction of an embodiment of a mount structure of exemplary embodiments of the propulsion system and aircraft of FIGS. 1-2 in a substantially unloaded state; and FIG. 14 is a schematic depiction of an embodiment of a mount structure of exemplary embodiments of the propulsion system and aircraft of FIG. 13 when the propulsion system is deflected to or beyond a threshold condition.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system mount system including a cantilevered core configuration with a deflection limiting aft mount structure are depicted and described herein. Embodiments of the propulsion system and aircraft provided herein may allow for benefits associated with cantilevered core configuration. Benefits include mitigating transfer of bending moments and other loads through the aft mount during normal operation, such as to mitigate distortions, asymmetry, and undesired clearances between a rotating structure of the propulsion system and a surrounding static casing of the propulsion system. Furthermore, the aft mount structure depicted and described herein limits excessive deflection, oscillation, wagging, or other movements of the core engine relative to a nominal centerline axis following extreme maneuvers. The aft mount structure provided herein allows for load sharing between the aft mount and the forward mount following extreme maneuvers while remaining cantilevered or generally unloaded at the aft mount during normal operation.

Referring now to the drawings, in FIG. 1, an exemplary embodiment of an aircraft 100 according to an aspect of the present disclosure is provided. The aircraft 100 includes an aircraft structure or airframe 105. The airframe 105 includes a fuselage 110 to which wings 120 and an empennage 130 are attached. A propulsion system 10 according to aspects of the present disclosure is attached to one or more portions of the airframe. In certain instances, the propulsion system 10 is attached to an aft portion of the fuselage 110. In certain other instances, the propulsion system 10 is attached underneath, above, or through the wing 120 and/or portion of the empennage 130.

In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Referring now to FIG. 2, an embodiment of the propulsion system 10 is provided. The propulsion system 10 may generally be configured as a turbo machine, such as a gas turbine engine including a compressor section 42, a combustion section 44, and a turbine section 46 in serial flow arrangement. Certain embodiments of the propulsion system 10 are configured as a turbofan or turbojet engine including a fan assembly 14 operatively connected to a core engine 40. Still various embodiments may define the propulsion system 10 as an open rotor, propfan, or Brayton cycle machine.

A front frame 12 connects the core engine 40, fan assembly 14, and nacelle 16 to the airframe 105. In various embodiments, the nacelle 16 surrounds the core engine 40. In one embodiment, the nacelle 16 surrounds the core engine 40, such as in an open rotor or unducted fan engine arrangement. In another embodiment, the nacelle 16, or portions thereof, surround a fan rotor assembly 18 of the fan assembly 14, or portions thereof.

In various embodiments, the front frame 12 generally includes a forward casing generally including bearing assemblies, dampers, and lubricant scavenge and supply conduits. The front frame 12 may further include one or more stages additional rotating fan stages or a booster. In various embodiments, the forward frame 12 is a fan hub frame, a compressor intermediate case, or other static structure surrounding at least a portion of the compressor section 42 or positioned at least partially forward of the compressor section.

The core engine 40 includes an aft frame 22 positioned rearward of the front frame 12 relative to a direction of flow of fluid across the aircraft 100. In various embodiments, the aft frame 22 is a turbine rear frame, turbine center frame, mid-turbine frame, or other static structure surrounding at least a portion of the turbine section 46.

The airframe 105 is connected to the propulsion system 10 at the forward frame 12. In particular embodiments, the propulsion system 10 is connected to the airframe by way of a front mount link 32. In still certain embodiments, the propulsion system 10 is mounted generally and substantially in cantilevered arrangement from the airframe 105 by way of the front mount link 32.

The aft frame 22 is selectively connected to the airframe 105 by an aft mount link 34. The aft mount link 34 is extended between the aft frame 22 and the airframe. The aft mount link 34 is selectively loaded by deflection of the core engine 40.

Referring to FIGS. 1-3, a nominal centerline axis 101 defines a reference centerline of the propulsion system 10 when attached to the airframe 105 in a static state condition (e.g., when the propulsion system 10 is not operating). An engine centerline axis 11 defines a reference centerline of the propulsion system 10 during operation of the propulsion system 10. Operation of the propulsion system 10 includes, but is not limited to, dry and wet motoring, ignition, idle, takeoff or maximum power, climb, cruise, approach, landing, and reverse thrust. During normal operation of the propulsion system 10 and aircraft 100, the propulsion system may deflect relative to the nominal position of the propulsion system. For instance, during non-operation or certain operating conditions, the nominal centerline axis 101 and the engine centerline axis 11 may be substantially coaxial or co-linear. However, during certain high loading conditions, such as following foreign object debris ingestion, bird strikes or ingestion, fan blade out, ice ingestion, or other adverse operating conditions, the propulsion system 10 may excessively deflect such that an angle 103 between the nominal centerline axis 101 and the engine centerline axis 11 reaches or exceeds an angle threshold. The angle threshold may generally define an angle at which the core engine 40 deflects relative to the nominal centerline axis 101 such that the core engine 40 contacts the airframe, such as surrounding casing.

To prevent excessive deflection of the core engine 40, the aft mount link 34 is selectively loaded by deflection of the core engine 40. In various embodiments, the aft mount link 34 is in direct contact with the aft frame 22 when the core engine 40 is deflected beyond the angle threshold. However, during normal or nominal operation of the aircraft 100 and propulsion system 10, the aft mount link 34 and the aft frame 22 are positioned to form a gap 115 therebetween, such as depicted in regard to FIG. 4-8. As such, the gap 115 between the aft mount link 34 and the aft frame 22 of the core engine 40 allows for a cantilevered mounting of the propulsion system 10 during normal operation, such as to mitigate distortion of clearances within the core engine 40 by mitigating transference of a bending moment through the aft mount 22. As a result, the gap 115 mitigates or eliminates performance or operability losses associated with reduced clearances or distortions between rotary members and surrounding cases of the core engine 40.

To provide loading of the aft mount link 34 when the core engine 40 is deflected, the aft mount link 34 includes a first contact portion 134 and the aft frame 22 includes a second contact portion 234. The first contact portion 134 and the second contact portion 234 are together positioned such as to define a loaded condition when the core engine 40 is deflected to or beyond the angle threshold. The first contact portion 134 and the second contact portion 234 are furthermore positioned to define an unloaded condition when the core engine 40 is below the angle threshold (i.e., an angle of the nominal centerline axis 101 versus the engine centerline axis 11 is less than the angle threshold).

Referring to FIG. 4, in one embodiment, the aft mount link 34 including the first contact portion 134 includes or defines a first platform 122 extended at least partially along a circumferential direction C relative to the nominal centerline axis 101. In certain embodiments, two or more aft mount links 34 together include the first platform 122 as a ring extended circumferentially around the core engine 40. The aft frame 22 including the second contact portion 234 includes a second platform 222 positioned inward of the first platform 122 along a radial direction R relative to the nominal centerline axis 101.

During normal propulsion system operation such as described above, the gap 115 is defined between the first platform 122 and the second platform 222. When the core engine 40 is deflected to or beyond the angle threshold, the first platform 122 of the aft mount link 34 is in direct contact with the second platform 222 at the aft frame 22 when the core engine 40.

In various embodiments, the aft mount link 34 includes or defines a rigid member. Referring to FIGS. 5-8, in one embodiment, the aft mount link 34 defining a rigid member is connected to the first contact portion 134 including a first mount ring 124. The second contact portion 234 at the aft frame 22 includes a second mount ring 224 chain-linked to the first mount ring 124. As such, the first mount ring 124 and the second mount ring 224 are coupled in tension when the core engine 40 is deflected to or beyond the angle threshold (depicted in FIG. 6), and the first mount ring 124 and the second mount ring 224 are generally and substantially unloaded during normal propulsion system operation (depicted in FIG. 5), i.e., an angle of the nominal centerline axis 101 versus the engine centerline axis 11 is less than the angle threshold.

Referring to FIGS. 9-12, in certain embodiments, the aft mount link 34 includes a scissor linkage 126 connected to the airframe 105 and the aft frame 22. The aft mount link 34 including the scissor linkage 126 is configured in tension when the core engine 40 is deflected to or beyond the angle threshold (depicted in FIGS. 10 and 12), and the aft mount link 34 is generally and substantially unloaded during normal propulsion system operation (depicted in FIGS. 9 and 11).

Referring to FIGS. 13-14, in still certain embodiments, the aft mount link 34 includes a cable 128 connected to the airframe 105 and the aft frame 22. The aft mount link 34 including the cable 128 is configured as a rigid member when the core engine 40 is deflected to or beyond the angle threshold (depicted in FIG. 14), and the aft mount link 34 is generally and substantially unloaded during normal propulsion system operation (depicted in FIG. 13).

Referring back to FIGS. 4-14, in various embodiments, the aircraft 100 includes a plurality of the aft mount link 34 extended between the airframe 105 and the aft frame 22. In one embodiment, at least two of the aft mount link 34 are positioned in 90 degree relationship to one another, such as depicted in FIG. 8). As such, a first aft mount link limits excessive deflection of the core engine 40 along a first axis (e.g., a vertical axis) and a second aft mount link limits excessive deflection of the core engine 40 along a second axis (e.g., a horizontal axis). In another embodiment, at least two of the aft mount link 34 are positioned in 180 degree relationship to one another. In certain embodiments, the 180 degree relationship arrangement of aft mount links 34 allows for compression of the rigid member when the core engine 40 is deflected to or beyond the angle threshold, such as depicted in FIG. 4.

Embodiments of the propulsion system 10 and aircraft 100 depicted and described herein provide mount structures and systems allowing for benefits from a cantilevered mount structure at the forward frame 12 while mitigating or eliminating undesired distortion or load transfer at the aft frame 22 during normal operation. Furthermore, the aft frame 22 and aft mount link 34 depicted and described herein limit undesired oscillations or deflections of the core engine 40 following extreme maneuvers and allows for partial load transfer through the aft frame 22 and airframe 105. As noted above, extreme maneuvers may include foreign object debris ingestion, bird strikes, fan blade-out, ice ingestion, or other major failures. As such, failures or other detriments associated with the forward frame 12 and front mount link 32 are mitigated or eliminated. Mitigated detriments include reduced size and weight at the forward frame 12 and front mount link 32, which may allow for improved propulsion system and aircraft weight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An aircraft propulsion system, the aircraft propulsion system defining a nominal centerline axis, the aircraft propulsion system including a fan assembly operably connected to a core engine. The fan assembly includes a forward frame and the core engine comprising an aft frame. The core engine includes an engine centerline axis in which the engine centerline axis is substantially coaxial to the nominal centerline axis during normal propulsion system operation. The engine centerline axis is at an acute angle to the nominal centerline axis when the core engine is deflected. A nacelle surrounds the core engine, wherein the nacelle is connected to the forward frame. An aft mount link is connected to the nacelle. The aft mount link is extended between the nacelle and the aft frame, and the aft mount link is loaded by deflection of the core engine.

2. The aircraft propulsion system of any previous clause, the aircraft propulsion system including direct contact of the aft mount link and the aft frame when the core engine is deflected.

3. The aircraft propulsion system of any previous clause, wherein the aft mount link includes a rigid member, wherein the rigid member is in tension when the core engine is deflected, and wherein the rigid member is substantially unloaded during normal propulsion system operation.

4. The aircraft propulsion system of any previous clause, the aircraft propulsion system including a gap between the aft mount link and the aft frame during normal propulsion system operation.

5. The aircraft propulsion system of any previous clause, wherein the aft mount link includes a first platform extended at least partially along a circumferential direction relative to the nominal centerline axis, and wherein the aircraft propulsion system includes a gap between the first platform and the aft frame during normal propulsion system operation.

6. The aircraft propulsion system of any previous clause, wherein the aft frame includes a second platform positioned inward of the first platform along a radial direction relative to the nominal centerline axis, and wherein the first platform of the aft mount link is in direct contact with the second platform at the aft frame when the core engine is deflected.

7. The aircraft propulsion system of any previous clause, wherein the aft mount link includes a rigid member connected to a first mount ring, and wherein the aft mount includes a second mount ring chain-linked to the first mount ring, wherein the first mount ring and the second mount ring are coupled in tension when the core engine is deflected, and wherein the first mount ring and the second mount ring are substantially unloaded during normal propulsion system operation.

8. The aircraft propulsion system of any previous clause, wherein the aft mount link includes a scissor linkage connected to the nacelle and the aft frame, wherein the aft mount link including the scissor linkage is configured in tension when the core engine is deflected, and wherein the scissor linkage is configured as substantially unloaded during normal propulsion system operation.

9. The aircraft propulsion system of any previous clause, wherein the aft mount link includes a cable connected to the nacelle and the aft frame, wherein the cable is configured as a rigid member when the core engine is deflected, and wherein the cable is configured as substantially unloaded during normal propulsion system operation.

10. The aircraft propulsion system of any previous clause, the aircraft propulsion system including a plurality of the aft mount link, wherein at least two of the aft mount link are positioned in approximately 90 degrees apart from one another.

11. An aircraft including an airframe including one or more of a fuselage, a wing, or an empennage; a propulsion system including a front frame and an aft frame, wherein a front mount link is connected to the airframe and the front frame, and wherein the aft frame is selectively connected to the airframe by an aft mount link.

12. The aircraft of any previous clause, wherein the propulsion system includes a gap between the aft mount link and the aft frame during normal propulsion system operation.

13. The aircraft of any previous clause, wherein the aft mount link of the propulsion system includes a rigid member, wherein the rigid member is in tension when the propulsion system is deflected, and wherein the rigid member is substantially unloaded during normal propulsion system operation.

14. The aircraft of any previous clause, wherein the propulsion system includes a gap between the aft mount link and the aft frame during normal propulsion system operation.

15. The aircraft of any previous clause, wherein the aft mount link of the propulsion system includes a first platform extended at least partially along a circumferential direction relative to the nominal centerline axis, and wherein the aircraft propulsion system includes a gap between the first platform and the aft frame during normal propulsion system operation.

16. The aircraft of any previous clause, wherein the aft frame of the propulsion system includes a second platform positioned inward of the first platform along a radial direction relative to the nominal centerline axis, and wherein the first platform of the aft mount link is in direct contact with the second platform at the aft frame when the core engine is deflected.

17. The aircraft of any previous clause, wherein the aft mount link of the propulsion system includes a rigid member connected to a first mount ring, and wherein the aft mount includes a second mount ring chain-linked to the first mount ring, wherein the first mount ring and the second mount ring are coupled in tension when the core engine is deflected, and wherein the first mount ring and the second mount ring are substantially unloaded during normal propulsion system operation.

18. The aircraft of any previous clause, wherein the aft mount link of the propulsion system includes a scissor linkage connected to the airframe and the aft frame, wherein the aft mount link including the scissor linkage is configured in tension when the core engine is deflected, and wherein the scissor linkage is configured as substantially unloaded during normal propulsion system operation.

19. The aircraft of any previous clause, wherein the aft mount link of the propulsion system includes a cable connected to the airframe and the aft frame, wherein the cable is configured as a rigid member when the core engine is deflected, and wherein the cable is configured as substantially unloaded during normal propulsion system operation.

20. The aircraft of any previous clause, the propulsion system including a plurality of the aft mount link, wherein at least two of the aft mount link are positioned in approximately 90 degrees apart from one another.

21. The aircraft of any previous clause including the aircraft propulsion system of any previous clause.

What is claimed is:

1. An aircraft propulsion system, the aircraft propulsion system defining a nominal centerline axis, the aircraft propulsion system comprising:
  a fan assembly operably connected to a core engine, the fan assembly comprising a forward frame and the core engine comprising an aft frame, the core engine comprising an engine centerline axis, wherein the engine centerline axis is substantially coaxial to the nominal centerline axis during normal propulsion system operation, and wherein the engine centerline axis is at an acute angle to the nominal centerline axis when the core engine is deflected;

a nacelle surrounding the core engine, wherein the nacelle is connected to the forward frame;

an aft mount link connected to the nacelle, wherein the aft mount link is extended between the nacelle and the aft frame, and wherein the aft mount link is loaded by deflection of the core engine, wherein the aircraft propulsion system comprises direct contact of the aft mount link and the aft frame when the core engine is deflected, wherein the aft mount link comprises a first platform extended at least partially along a circumferential direction relative to the nominal centerline axis, and wherein the aircraft propulsion system comprises a gap between the first platform and the aft frame during normal propulsion system operation, and wherein the aft frame comprises a second platform positioned inward of the first platform along a radial direction relative to the nominal centerline axis, and wherein the first platform of the aft mount link is in direct contact with the second platform at the aft frame when the core engine is deflected.

2. The aircraft propulsion system of claim 1, wherein the aft mount link comprises a rigid member, wherein the rigid member is in tension when the core engine is deflected, and wherein the rigid member is substantially unloaded during normal propulsion system operation.

3. The aircraft propulsion system of claim 1, the aircraft propulsion system comprising a gap between the aft mount link and the aft frame during normal propulsion system operation.

4. The aircraft propulsion system of claim 1, the aircraft propulsion system comprising a plurality of the aft mount link, wherein at least two of the aft mount link are positioned in approximately 90 degrees apart from one another.

5. An aircraft comprising:
an airframe comprising one or more of a fuselage, a wing, or an empennage;
a propulsion system comprising a front frame and an aft frame, wherein a front mount link is connected to the airframe and the front frame, and wherein the aft frame is selectively connected to the airframe by an aft mount link,
wherein the propulsion system comprises a gap between the aft mount link and the aft frame during normal propulsion system operation,
wherein the aft mount link of the propulsion system comprises a first platform extended at least partially along a circumferential direction relative to a nominal centerline axis, and wherein the propulsion system comprises a gap between the first platform and the aft frame during normal propulsion system operation, and
wherein the aft frame of the propulsion system comprises a second platform positioned inward of the first platform along a radial direction relative to the nominal centerline axis, and wherein the first platform of the aft mount link is in direct contact with the second platform at the aft frame when a core engine is deflected.

6. The aircraft of claim 5, wherein the aft mount link of the propulsion system comprises a rigid member, wherein the rigid member is in tension when the propulsion system is deflected, and wherein the rigid member is substantially unloaded during normal propulsion system operation.

7. The aircraft of claim 5, the propulsion system comprising a plurality of the aft mount link, wherein at least two of the aft mount link are positioned in approximately 90 degrees apart from one another.

8. An aircraft propulsion system, the aircraft propulsion system defining a nominal centerline axis, the aircraft propulsion system comprising:
a fan assembly operably connected to a core engine, the fan assembly comprising a forward frame and the core engine comprising an aft frame, the core engine comprising an engine centerline axis, wherein the engine centerline axis is substantially coaxial to the nominal centerline axis during normal propulsion system operation, and wherein the engine centerline axis is at an acute angle to the nominal centerline axis when the core engine is deflected;
a nacelle surrounding the core engine, wherein the nacelle is connected to the forward frame;
an aft mount link connected to the nacelle, wherein the aft mount link is extended between the nacelle and the aft frame, and wherein the aft mount link is loaded by deflection of the core engine,
wherein the aft mount link comprises a rigid member connected to a first mount ring, and wherein the aft mount link comprises a second mount ring chain-linked to the first mount ring, wherein the first mount ring and the second mount ring are coupled in tension when the core engine is deflected, and wherein the first mount ring and the second mount ring are substantially unloaded during normal propulsion system operation.

9. An aircraft comprising:
an airframe comprising one or more of a fuselage, a wing, or an empennage;
a propulsion system comprising a front frame and an aft frame, wherein a front mount link is connected to the airframe and the front frame, and wherein the aft frame is selectively connected to the airframe by an aft mount link,
wherein the aft mount link of the propulsion system comprises a rigid member connected to a first mount ring, and wherein the aft mount link comprises a second mount ring chain-linked to the first mount ring, wherein the first mount ring and the second mount ring are coupled in tension when a core engine is deflected, and wherein the first mount ring and the second mount ring are substantially unloaded during normal propulsion system operation.

\* \* \* \* \*